United States Patent [19]

Tsuchiya et al.

[11] 4,068,256

[45] Jan. 10, 1978

[54] VIDEO RECORDING APPARATUS WITH COLOR KILLER

[75] Inventors: Takao Tsuchiya, Fujisawa; Hisaaki Narahara, Musashino, both of Japan

[73] Assignee: Sony Corporation, Tokyo, Japan

[21] Appl. No.: 675,631

[22] Filed: Apr. 9, 1976

[30] Foreign Application Priority Data

Apr. 14, 1975 Japan .................................. 50-44927

[51] Int. Cl.² .......................... H04N 5/76; H04N 9/49
[52] U.S. Cl. .......................................... 358/4; 358/8; 358/26
[58] Field of Search ..................... 358/4, 8, 26, 27, 36, 358/37, 40, 29, 41, 43, 21

[56] References Cited

U.S. PATENT DOCUMENTS 3,975,759   8/1976   Taniguchi et al. ..................... 358/4

Primary Examiner—Robert L. Richardson
Attorney, Agent, or Firm—Hill, Gross, Simpson, Van Santen, Steadman, Chiara & Simpson

[57] ABSTRACT

A chrominance signal trapping circuit is provided in a video signal monitoring line of a color video signal recording apparatus.

An operation of the trapping circuit is ganged with an operation of a color killer circuit of the recording apparatus.

The trapping circuit prevents a chrominance component of an input video signal from being supplied to a monitor connected to the recording apparatus when the recording apparatus is operating in a monochrome mode, whereby an operating mode of the monitor is made to a monochrome mode forcedly and an operating mode of the monitor can be coincident with an operating mode of the recording apparatus automatically.

3 Claims, 1 Drawing Figure

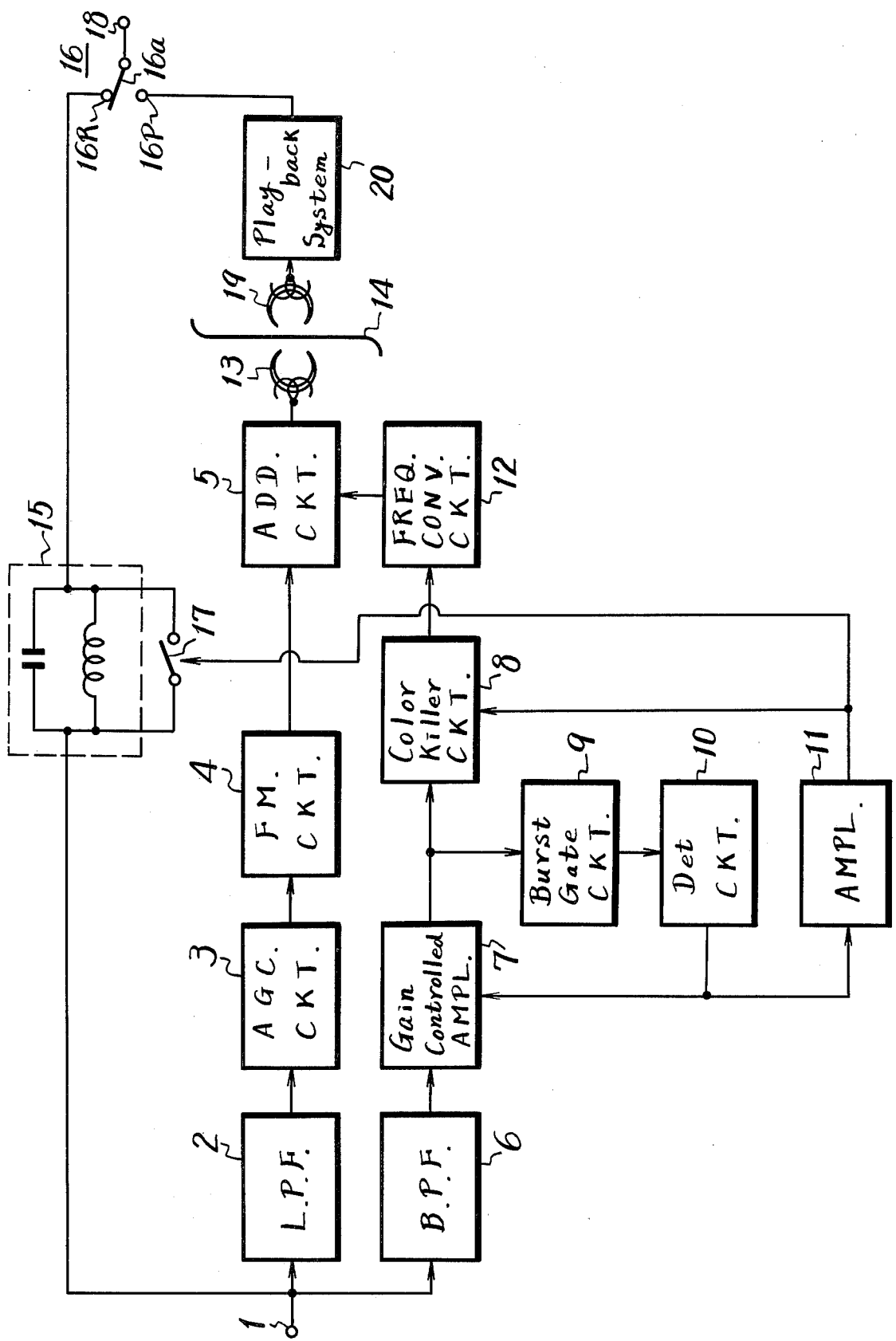

VIDEO RECORDING APPARATUS WITH COLOR KILLER

BACKGROUND OF THE INVENTION

1. Field of the Invention

This invention relates generally to a video recording apparatus and more particularly to a color video recording apparatus having a color killer circuit.

2. Description of the Prior Art

In general, with a prior art recording apparatus which records a color video signal, when a video signal is recorded thereby, a color video signal supplied to a recording signal input terminal is applied, as it is, to a color monitor to monitor the color video image which is recorded. In connection with a recording system of the recording apparatus there is provided a color killer circuit which operates such that when the level of a chrominance signal is low in the case where a monochrome video signal or a color video signal is recorded, an operation of a chrominance signal system is stopped to avoid an occurrence of color noises and hence to obtain good recording signals.

In general, in the prior art the color killer circuit of the color monitor is so constructed that it is operated with a signal whose level is lower than that of a signal operating the color killer circuit of the recording system of the recording apparatus. For this reason, the color killer circuit of the color monitor does not coincide with the color killer circuit of the recording system of the recording apparatus in operating point. As a result, there may occur such a problem that in the case where the chrominance signal of a color video signal is low in level, although an image monitored on the monitor is a color picture, a recording signal recorded by the recording apparatus is a monochrome video signal with no chrominance signal.

SUMMARY OF THE INVENTION

It is an object of this invention to provide a color video recording apparatus which can make an operating mode (color or monochrome) of a recording apparatus coincident with that of a monitor for it, automatically. It is an another object of this invention to provide a chrominance signal trapping circuit which is inserted in an input video signal monitoring line when the video recording apparatus operates in a monochrome mode.

According to an aspect of the present invention there is provided a video recording apparatus which comprises a video signal recording system which can operate both of a color mode and a chrominance mode, a video signal reproducing system, a detecting circuit for detecting a chrominance level of an input signal, a color killer circuit controlled by an output of said detecting circuit and switching an operating mode of the video signal recording system between the color mode and the monochrome mode, a video signal monitoring line provided between a video signal input terminal and a video signal output terminal to be connected to a monitor, the recording aparatus further comprising a chrominance signal trapping circuit controlled by the output of the detecting circuit, provided at the video signal monitoring line and rejecting a chrominance component of the input video signal when the video recording system is working in monochrome mode.

The other objects, features and advantages of the present invention will become apparent from the following description taken in conjunction with the accompanying drawing.

BRIEF DESCRIPTION OF THE DRAWING

An attached FIGURE is a schematic diagram showing an embodiment of the video recording apparatus according to the present invention.

DESCRIPTION OF THE PREFERRED EMBODIMENT

An embodiment of the video recording apparatus according to the present invention will be hereinafter described with reference to the attached single drawing.

In the attached FIGURE, 1 designates a video signal input terminal which is supplied with a video signal to be recorded. The video signal supplied to the input terminal 1 is fed through a series connection of a low pass filter 2, through which a luminance signal component contained in the video signal will pass, and an automatic gain control circuit 3 to a frequency modulating circuit 4. The frequency modulated signal obtained at the output side of the frequency modulating circuit 4 is supplied to an adding circuit 5. The video signal supplied to the input terminal 1 is also fed to a band pass filter 6 which will pass therethrough a chrominance signal component contained in the video signal. The output side of the band pass filter 6 is connected through a gain-controlled amplifier 7 to the input side of a color killer circuit 8. The output side of the gain-controlled amplifier 7 is also connected through a burst gate circuit 9, which will pass therethrough a burst signal contained in the output signal from the gain-controlled amplifier 7, to the input side of a detecting circuit 10. This detecting circuit 10 will produce at its output side a control signal which is in proportion to the level of the burst signal. The control signal obtained at the output side of the detecting circuit 10 is supplied to the gain control signal input terminal of the gain-controlled amplifier 7 to control its gain, and also supplied through an amplifier 11 to the color killer circuit 8. When the level of the killer control signal obtained from the amplifier 11 is lower than a predetermined level, the color killer circuit 8 is operated and hence the color killer circuit 8 produces no output signal at its output side. The output signal from the color killer circuit 8 is fed to a frequency converting circuit 12 to convert the chrominance signal into a low frequency signal. The chrominance signal converted to a low frequency signal by the frequency converting circuit 12 is fed to the adding circuit 5 whose output signal is fed to a magnetic head 13. Thus, the output signal from the adding circuit 5 is recorded on a magnetic tape 14 by the magnetic head 13.

The video signal supplied to the video signal input terminal 1 is further fed through a trapping circuit 15 which prevents the passage of the chrominance signal to a fixed contact 16R at the recording side of a changeover switch 16 which is ganged with an operating switch (not shown) of the recording apparatus. A shorting switch 17 is connected between the input and output sides of the trapping circuit 15. This shorting switch 17 is made ON and OFF with the killer control signal obtained at the output side of the amplifier 11. That is, when the color killer circuit 8 achieves the killer operation, the shorting switch 17 is opened or made OFF to prevent the supply of the chrominance signal to the fixed contact 16R, while when the color killer circuit 8 does not achieve the killer operation, the shorting switch 17 is closed or made ON to supply the chrominance signal to the fixed contact 16R. A movable contact 16a of the change-over switch 16 is connected to an output terminal 18 which is connected to the monitor (not shown).

The output signal from a reproducing magnetic head 19 is supplied to a play back system 20 which then produces video signal at its output side. The video signal from the play back system 20 is fed to a fixed contact 16P of the change-over switch 16 at the reproducing or playing back side.

With the apparatus of the invention constructed as above, the color video signal supplied to the input terminal 1 is fed to the low pass filter 2 and the band pass filter 6 through which the luminance signal and chrominance signal components are separated from the color video signal, respectively. Then, the luminance signal is used to frequency-modulate the carrier signal and the chrominance signal is converted to a low frequency signal. The frequency-modulated signal by the luminance signal and the chrominance signal converted to the low frequency signal are added in the adding circuit 5 and then recorded on the magnetic tape 14 by the magnetic head 13. In this case, when the chrominance signal in the input color video signal is sufficiently high in level, the color killer circuit 8 does not achieve its killer operation. Therefore, the shorting switch 17 is closed or made ON, and hence the color video signal supplied to the input terminal 1 is fed through the closed switch 17, the change-over switch 16 and the output terminal 18 to the monitor on which a color picture is reproduced. While, when the level of the chrominance signal is low, the color killer circuit 8 achieves its color killer operation, and hence it produces no output signal at its output side. Therefore, in such a case, only the frequency-modulated signal by the luminance signal is recorded on the magnetic tape 14 by the magnetic head 13. At this time, the shorting switch 17 is opened or made OFF, so that the monitor is supplied with the video signal from which the chrominance signal is eliminated by the trapping circuit 15. Acordingly, the monitor is made to a monochrome mode automatically and hence a monochrome picture is reproduced on the monitor. Thus, with the present invention such a defect is avoided that the video signal which is now recorded does not coincide with a picture reproduced on the monitor.

Further, it will be easily understood that a low pass filter, which may pass therethrough only the luminance signal, or the like can be used in place of the trapping circuit 15 used in the illustrated example.

The above description is given on the single preferred embodiment of the invention, but it will be apparent that many modifications and variations could be effected by one skilled in the art without departing from the spirit or scope of the novel concepts of the present invention.

We claim as our invention:

1. A video recording apparatus comprising:
   a video signal recording system which is operable in both a color mode and in a monochrome mode,
   a video signal reproducing system,
   said video signal recording system having a video signal input terminal and a detecting circuit for detecting a chrominance level of an input signal applied to said input terminal,
   a color killer circuit controlled by an output of said detecting circuit for switching the operating mode of said video signal recording system between the color mode and the monochrome mode,
   a video signal monitoring line for coupling a video signal from said video signal input terminal to a video signal output terminal to a monitor from said output terminal, and
   a chrominance signal trap circuit, controlled by an output of said detecting circuit, provided in said video signal monitoring line for rejecting a chrominance component of said input video signal when said video recording system is working in the monochrome mode.

2. A video recording apparatus in accordance with claim 1 wherein said chrominance signal trap circuit is in series with said video signal monitoring line and wherein a shorting switch is coupled in parallel with said trap circuit, said shorting switch is coupled in parallel with said trap circuit, said shorting switch being controlled by an output of said detecting circuit and having a high impedance to said chrominance component being rejected.

3. A video recording apparatus in accordance with claim 2 wherein an output from said detecting circuit causes said shorting switch to be opened for monochrome reception and closed for color reception.

* * * * *